United States Patent [19]

Carter

[11] 4,040,518
[45] Aug. 9, 1977

[54] STORAGE AND CARRYING CASE FOR COMPACT CASSETTES

[76] Inventor: Jesse Donald Carter, 741 Orizaba Ave., No. 3, Long Beach, Calif. 90804

[21] Appl. No.: 679,391

[22] Filed: Apr. 22, 1976

[51] Int. Cl.² ............... B65D 85/672; B65D 1/34
[52] U.S. Cl. ................. 206/387; 206/564; 206/560; 220/339; 220/306; 211/41
[58] Field of Search ............ 206/387, 72, 73; 211/41; 220/4 B, 4 E, 339, 306

[56] References Cited

U.S. PATENT DOCUMENTS

| 2,744,650 | 5/1956 | Woessner | 220/306 |
|---|---|---|---|
| 2,851,188 | 9/1958 | Pavelle | 206/72 |
| 2,935,108 | 5/1960 | Hall | 220/306 |
| 3,027,666 | 4/1962 | Briskin et al. | 206/73 |
| 3,206,012 | 9/1965 | Braginetz | 220/339 |
| 3,565,282 | 2/1971 | Staar | 206/387 |
| 3,756,383 | 9/1973 | Kryter | 206/73 |
| 3,825,110 | 7/1974 | Halbich et al. | 220/306 |
| 3,976,193 | 8/1976 | Dogliotti | 206/72 |

Primary Examiner—William Price
Assistant Examiner—Douglas B. Farrow
Attorney, Agent, or Firm—Charles A. Goodall

[57] ABSTRACT

A case for carrying and storing compact cassettes having a cassette tray and rearwardly hinged thereto a tray cover. The tray has a plurality of cassette positioning rib sets for positioning and retaining cassettes inserted into the tray in parallel transverse arrangement with a cassette recorder coupling edge parallel to the tray bottom and the cassette sides portions defining the cassette recorder coupling means of each inserted cassette touching or nearly touching adjacent cassettes. The case has a latch for openably latching the tray and tray cover in closed position and a carrying handle.

14 Claims, 16 Drawing Figures

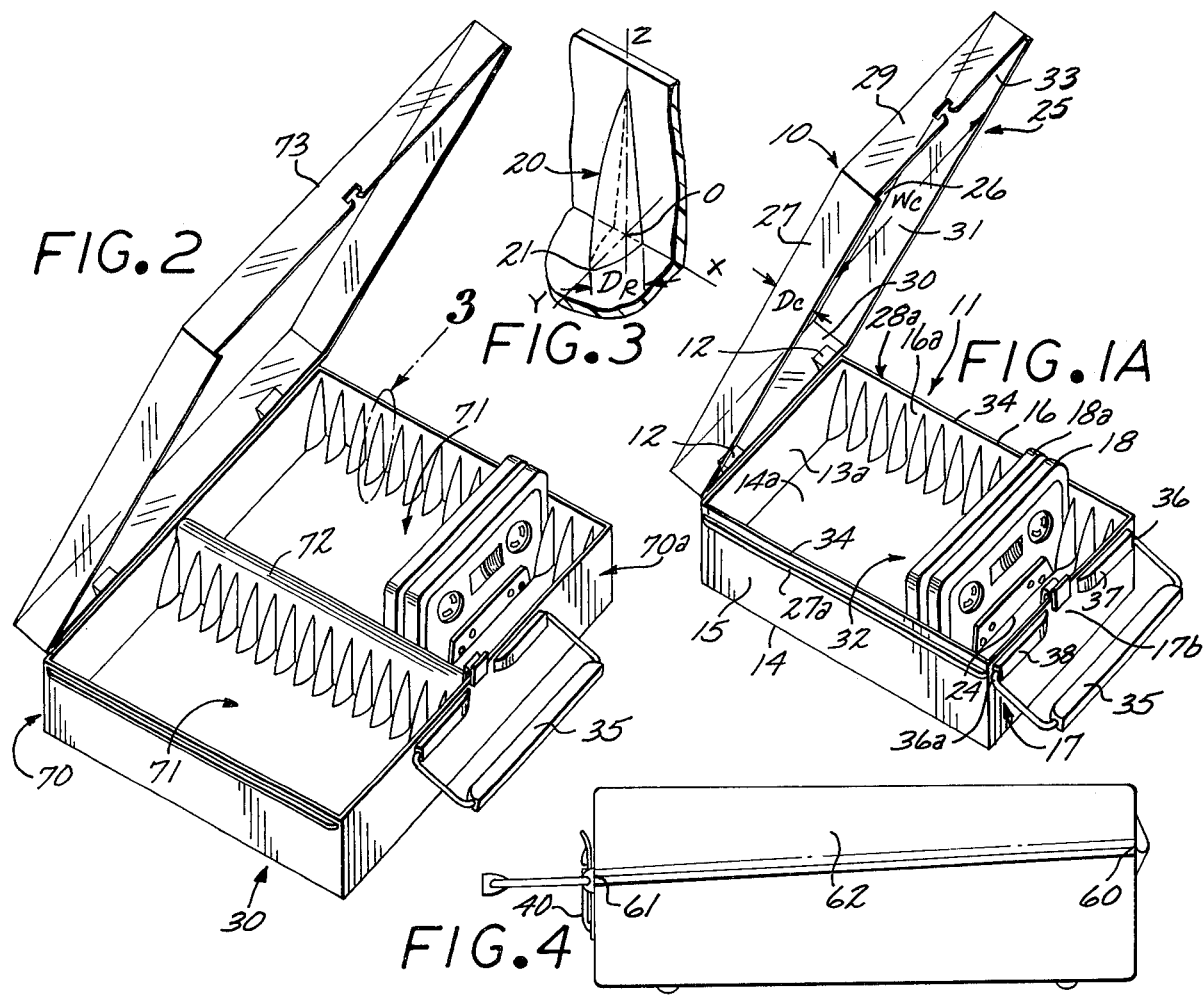
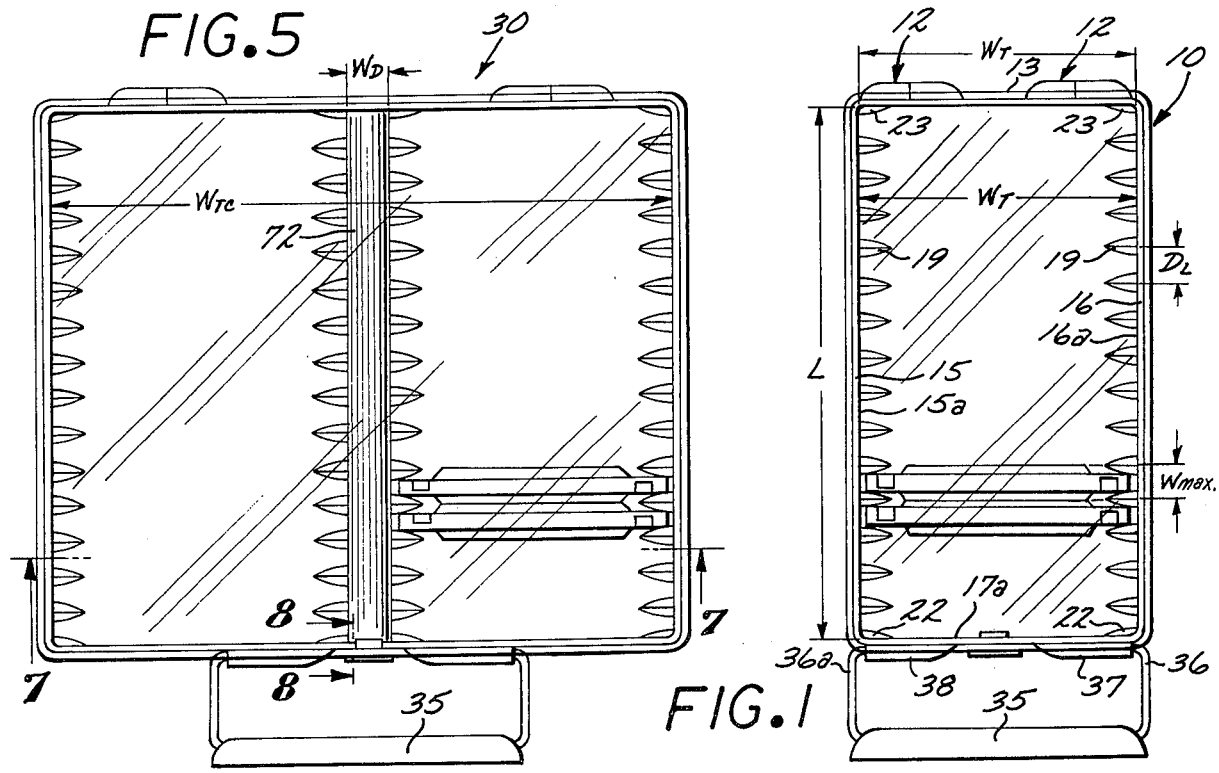

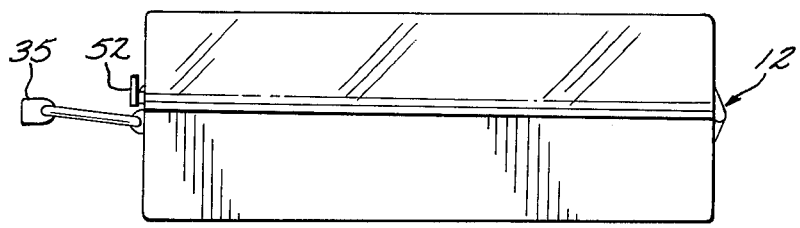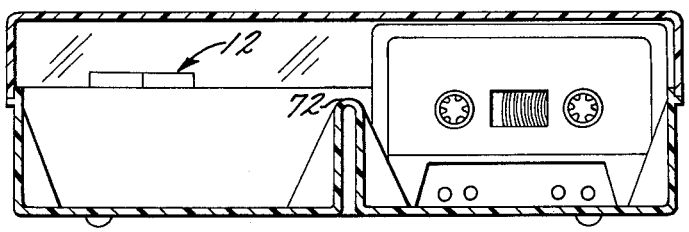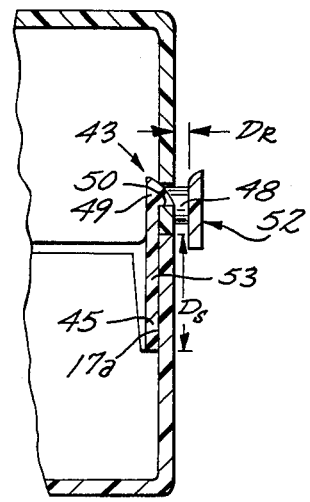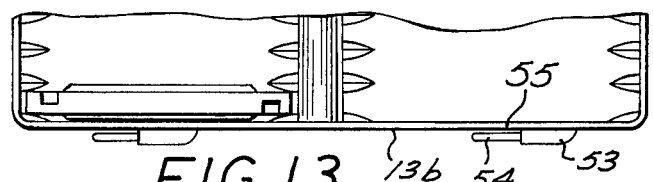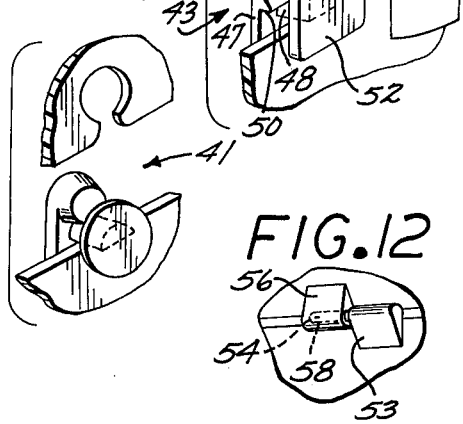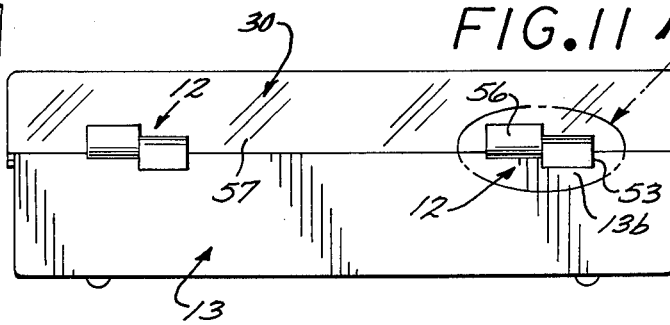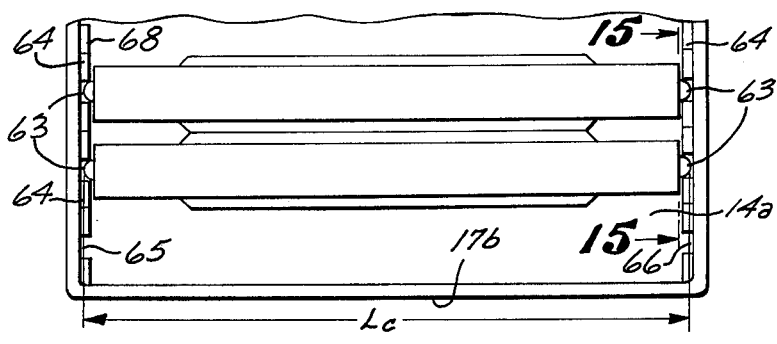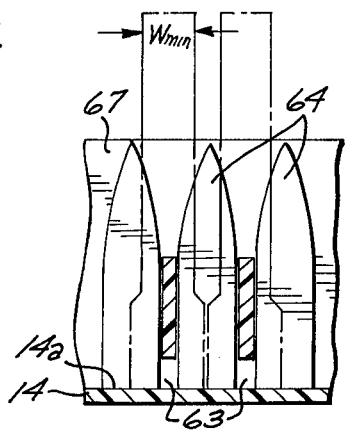

STORAGE AND CARRYING CASE FOR COMPACT CASSETTES

BACKGROUND OF THE INVENTION

1. Field of the Invention

This invention relates to a storage and carrying case for magnetic tape compact cassettes and more particularly for storing compact cassettes in transverse parallel relation in leafed arrangement in a covered case having a carrying handle for carrying the closed case. The case is provided with a cover which is removable to permit easy access to cassettes inserted in a cassette tray portion of the case.

2. Discussion of Prior Art

Magnetic tape cassettes of the compact cassette type are widely used for recording music, readings, sermons and the like and are increasingly used in dictating instruments. The compact cassette comprises a small case about 4 inches long, 2½ inches high and three-eighths of an inch thick, except at a recorder coupling edge along one of the long edges which is about ½ inch thick. The cassette case has two reel hub openings intermediate between a top and the recorder compling edges and has a pair of movable reels within having wound thereon magnetic recording tape about ¼ inch wide exposed along the recorder coupling edge for engagement with a recorder magnetic pick-up when the cassette is inserted into a recording/playing instrument.

The compact cassette has proven to be extremely useful for recording and play-back; however, satisfactory storage of these units has presented a significant problem. Many storage cases have been devised. Some of these provide for stacked arrangement, others provide for stacked arrangement in small compartments, the case having a plurality of such compartments. A case described in U.S. Pat. No. 3,627,113 provides for placing the cassettes with recorder coupling edge up in transverse alignment having upstanding separators with reel locking means on an upper end thereof, the case having a rearwardly hinged cover with a latching means and a pair of carrying handles on a front case portion, the case being constructed generally to appear like a book when closed. Another patented case, U.S. Pat. No. 3,756,383 describes a case having rearwardly hinged cover and cassette positioning ribs on a bottom of a lower case portion and further having cassette box positioning ribs along front and back walls of the case.

Each of these cases have some draw-backs, among these being poor space utilization and complexity of construction and when open the cover adds to the space required for access to the cassettes.

SUMMARY OF THE INVENTION

It is an object of the present invention to provide a simplified storage and carrying case for a plurality of compact cassettes. The simple construction makes it possible to inexpensively manufacture the case.

A further object is to provide a cassette case with a removable cover so that open case space requirements are minimized making the case particularly desirable and adaptable for use in an automobile or an office for storing dictating cassettes of the compact cassette type.

In summary, the invention relates to a storage and carrying case for compact cassettes wherein the cassettes are inserted into one or more cassette tray compartments, there being provided a single compartment case and a case having a plurality of two or more compartments. The cassettes are inserted into a case cassette tray compartment in parallel transverse position being held in place between adjacent rib sets, one member of each rib set being on each compartment side wall inner space being integral with the side wall and extending a relatively short distance transversely along a tray bottom wall at right angles to the side walls, each member of a rib set being in transverse parallel alignment with the other member of the rib-set. Each compartment has a plurality of rib-sets disposed longitudinally from a first rib set adjacent a tray front wall to a last rib-set adjacent a tray back wall. Each of the rib-sets have a distance between adjacent rib sets such that a compact cassette positioned between adjacent rib-sets with a cassette recorder coupling edge resting on and being parallel to a tray bottom wall inner surface nearly touches a compact cassette similarly positioned between adjacent rib sets. The invention provides for a tray having one compartment defined by left and right sidewalls, front and back walls, and a bottom wall joined together to form an open top tray, said walls extending above the bottom wall a heighth less than that of a compact cassette. The compartment so formed has a width slightly greater than the length of a compact cassette and has an inside length between front and back walls equal to a sum of a plurality of incremental distances, each increment being slightly greater than a maximum width of a compact cassette. The case has a top cover rearwardly hinged to the tray back wall having a cover top wall, left and right sidewalls, and front and back walls joined together to form an open bottom tray cover having an opening width slightly larger than a tray top opening width and the walls being of at least sufficient depth, when closed, to enclose compact cassettes positioned transversely within the tray. The invention further provides for a tray having two or more compartments having a first compartment bounded by inner surfaces of a tray right wall, front and back walls and a partition wall right inner surface, and a last compartment bounded by inner surfaces of a tray left wall, front and back walls and a partition wall left inner surface, intervening compartments therebetween each being bounded by tray front and back wall inner surfaces and respective partition wall right and left inner surfaces. The case has a front wall latching means for releasably fastening the cover in closed position and a handle means for carrying the closed case. The cover is hinged to the tray by hinge means providing for slideably removing the opened cover from the tray.

BRIEF DESCRIPTION OF THE APPLICATION DRAWINGS

FIG. 1 is a top plan view of the storage and carrying case for compact cassettes having one compartment and a transparent cover exposing the interior with cassettes stored therein.

FIG. 1a is a perspective view of an opened one-compartment case.

FIG. 2 is a perspective view of an opened two-compartment case.

FIG. 3 is a geometric drawing of a rib-set member of inset 3 of FIG. 2.

FIG. 4 is a side view of a storage and carrying case for compact cassettes in closed position wherein the tray side walls taper downwardly from back wall to front wall and the cover side walls are in mating alignment therewith, further showing a conventional suit case latch means.

FIG. 5 is a top plan view of a closed two-compartment case having a transparent cover exposing the tray internal structure with cassettes inserted therein.

FIG. 6 is a side plan view of a case having uniformly high side, front and back walls.

FIG. 7 is a cross-sectional view taken along line 7—7 of FIG. 5.

FIG. 8 is a cross-sectional view taken along line 8—8 of FIG. 5 showing a cover latching means.

FIG. 9 is a perspective view of the cover latching means shown in FIG. 5 showing a rectangular latch engaging throughhole and latch hook.

FIG. 10 is a perspective view of the cover latching means showing a circular latch engaging throughhole and latch hook.

FIG. 11 is a back view of the case showing the cover hinges with the cover in closed position.

FIG. 12 is a view of inset 12 of FIG. 11 showing a hinge in slightly opened position.

FIG. 13 shows a top fragmentary view of a case tray with the cover removed.

FIG. 14 is a fragmentary top view of a case tray showing rib sets which are substantially parallel the tray side walls having slots between adjacent ribs for keying on extensions on each of the side edges of a compact cassette and showing compact cassettes inserted in the tray in transverse parallel arrangement.

FIG. 15 is a fragmentary side view of the tray shown in FIG. 14.

DESCRIPTION OF PREFERRED EMBODIMENTS

Preferred embodiments of the storage and carrying case for compact cassettes of the present invention are illustrated in the accompanying drawings—FIGS. 1 through 15. A single compartment case 10 is shown in FIGS. 1, 1a, and 14. A two compartment case 70 is shown in FIGS. 2, 5, 7 and 13.

The single compartment case 10 comprises in combination a cassette tray 11 having rearwardly hinged thereto by hinge means 12 to a tray back wall 13 a top cover 25. The tray 11 has a bottom wall 14, a left sidewall 15, a right sidewall 16, a front wall 17 and a back wall 13 joined together to form an open topped rectangular shaped cassette tray 11. The tray 11 left and right sidewalls 15, 16 and front and back walls 17, 13 extend vertically and substantially equidistantly above the tray bottom wall 14 a heighth less than that of a compact cassette 18 inserted into the tray, said inserted cassette 8 having a recorder coupling edge 19 adjacent to and parallel with a tray bottom wall inner surface 14a. The tray 11 has in inside width $W_T$ between right and left sidewalls 16, 15 slightly greater than a compact cassette length $L_C$ (See FIG. 14). The tray 11 has an inside length $L_T$ (FIG. 1) between front and back walls 17, 13 equal to a sum of a plurality of incremental distances, each incremental distance $D_i$ being slightly greater than a compact cassette maximum width $W_{max}$, said sum being determined by the number of compact cassettes 18 the case 10 is constructed to store and carry. The tray 11 is further provided with a plurality of cassette positioning rib sets 19, a first rib set member 20 of each set being integral with a right tray wall inner surface 16a and extending a relatively short distance $D_R$ (FIG. 3) outwardly therefrom and at a lower rib portion 21 the said member 20 is integral with the tray bottom wall inner surface 14a and extends along said bottom wall inner surface 14a said relatively short distance $D_R$. A remaining second rib set member is similarly disposed along a left tray wall inner surface 15a and the bottom wall inner surface 14a in parallel alignment with the first rib set member 20. The plurality of rib sets are disposed longitudinally from a first rib set 22 adjacent a front wall inner surface 17a to a last rib set 23 adjacent a back tray wall inner surface 13a. Each of the rib sets 19 has a distance $D_L$ between adjacent rib sets such that a compact cassette 18 positioned therebetween with a recorder coupling edge 24 resting on and parallel to the tray bottom wall inner surface 14a nearly touches an adjacent compact cassette 18a similarly inserted between adjacent rib sets adjacent cassettes being in leafed arrangement. The top cover 25 has a top wall 26, left and right cover sidewalls 27, 28, and front and back cover walls 29, 30 joined together to form an open bottom rectangular shaped tray cover. The cover may have an inside opening width $W_c$ between cover sidewalls slightly greater than a tray top outside opening width $W_T$, the cover 25 walls 27, 28, 29, 30 being of at least sufficient depth $D_C$, when the cover 25 is closed to enclose compact cassettes 12 positioned transversely within the tray 11 and to permit the cover sidewalls 27, 28 to slightly overlap the tray sidewalls 15, 16. This construction provides left and right cover stop members 27a, 28a disposed longitudinally near tray side wall tops along the tray sidewalls from front to back. The right stop member 28a is not shown in the drawing but is similar to the left stop member 27a. A case construction may also be such that a cover bottom opening 31 mates with a tray top opening 32 and when the cover is closed, the cover wall edges 33 and the tray wall edges 34 are in mating alignment.

The case 10 is provided with a carrying handle 35 having right and left bracket connecting members 36, 36a mounted in right and left handle brackets 37, 38 on a tray front wall outer surface 17b.

The case also is provided with a latching means 39. The latch means may comprise any of the presently available luggage type latching devices such as a suit case latch 40 shown in FIG. 4, but more preferably a novel rectangular version snap lock cassette case latch means 41 shown in FIG. 9 or a circular version snaplock cassette case latch means shown in FIG. 10 may be used. The rectangular version latch means comprises in combination a tray cover rectangular latch engaging throughhole 42 in a cover front wall 17 located a relatively short distance $D_T$ above a tray cover front wall lower edge 33f and a latch member 43, said throughhole extending from a cover front wall front surface 17f through the front wall. The throughhole 42 has a latch positioning slot 44 opening downwardly from the throughhole 42 and out of the front wall lower edge 33f. The latch member 43 comprises a lower mounting end 45 (FIG. 8) mounted on a tray front wall inner surface 17a a relatively short distance $D_S$ below a tray front wall top surface 46 (FIG. 9); an upper end portion 47 having a latch positioning member 48 extending forwardly from the upper end portion 47 and across the front wall top surface 46 and forward therefrom an engagement relief distance $D_R$ greater than a throughhole engaging hook means 49 hook length 50 (FIG. 8). The latch positioning member 48 is for aligning the latch hook means 49 in latching position being inserted into the said slot 44 when the cover is closed. The upper end portion 47 further has integral therewith being disposed above the latch positioning member 48 a throughhole engaging hook means 49 for engaging a throughhole wall lower surface 51 of the cover throughhole when the cover is closed. The extended latch positioning member 48 comprises a push button means 52 for disengaging the latch hook means 49 from the throughhole 42 to permit opening a closed cover by depressing the push button 52 thereby disengaging the latch hook means 49 from the throughhole. The latch member has a resilient shank 53 intermediate and integral with the lower mounting 45 end and the upper end portion 47. The throughhole 42 configuration and the latch member 43 are generally of rectangular mating construction as shown in FIG. 9; however the invention is not limited to a rectangular configuration and may be square, round, as shown in FIG. 10, or other suitable configuration as desired.

Referring to FIGS. 11, 12, and 13, a rear view of a cassette case is illustrated and more particularly two hinges 12 are shown for hingingly connecting cover and tray back walls 30, 13. Each hinge 12 comprises in combination a hinge pin retaining member 53 fixedly attached to a tray back wall outer surface 13b having a cylindrical hinge pin 54 fixedly retained therein and extending outwardly therefrom in parallel alignment with a tray back wall top surface 55, and a hinge pin insertion member 56 fixedly attached to a cover back wall outer surface 57 having a hinge pin cylindrical insertion cavity 58 therein for slidably and rotatably inserting a mating hinge pin 54 thereinto thereby positioning the cover 25 above the tray in hinged position providing for swinging the cover 25 downwardly and upwardly with respect to the tray top opening 32 and further for slidably removing the cover 25 by sliding the cover 25 away from the hinge pin retaining member 53.

Referring to FIG. 4 a case is illustrated having tray right and left side walls 59 (left side wall not shown) tapered downwardly from back wall-sidewall corners 60 to front wall-side wall corners 61 and wherein cover side walls 62 taper oppositely and matingly with the tray sidewalls from back to front walls.

A multiple compartment compact cassette case 70 of this invention is illustrated in FIGS. 2, 5, 7 and 13. Each compartment 71 is constructed similarly to the single compartment case 10 described above. A two compartment tray 70a has an inside width $W_{TC}$ slightly greater than two cassette lengths $L_C$ (FIG. 14) plus a partition width $W_p$ of a partition 72. The tray 70a may be constructed having a plurality of two or more compartments having one less partition than the total number of compartments desired. The case 70 has in combination with the tray 70a a cover 73 rearwardly hinged to the tray 70a and constructed similar to the single compartment case cover 25 except said cover 73 is dimensioned to mate with the tray 70a. The multiple compartment case is provided with a carrying handle 35, latch means 41 and hinges 12 as described relative to the single compartment case 10.

Another embodiment of the case 10, 70 of this invention provides for a plurality of cassette positioning guide slots 63 (FIGS. 14 and 15) formed between adjacent rib set members 64 along each of the left and right side walls inner surfaces 65, 66. The slots 63 extend from a top sidewall portion 67 to the bottom wall inner surface 14a. The slot width is within a range of widths slightly greater than ⅛ inch and less than a compact cassette width $W_{MIN}$. The slots 63 have a depth from a rib inside surface 68 to the sidewall inner surfaces 65, 66 within a range of depths of from 1/16 inch to less than ⅛ inch. The slots are located along the sidewalls for positioning adjacent compact cassettes inserted therein in leafed nearly touching arrangement within the tray. The tray width between sidewall inner surfaces is slightly greater than a compact cassette length $L_C$.

The hinge pin retaining members 53 may be attached to the cover back walls and the hinge pin insertion members 56 may be attached to the tray back walls without departing from the invention disclosed.

The case may be constructed of any rigid material capable of retaining the shape and form of the case described herein including plastics, wood, metals, pressed board, pressed paper or any combination thereof without departing from the invention disclosed herein.

I claim as my invention:

1. A case for storing and carrying a plurality of magnetic tape cassettes of a type described as compact cassettes having two tape drive hub openings in the sides thereof and a cassette recorder coupling edge having a magnetic tape head engaging opening therein on said edge, said case comprising in combination:

a cassette tray for receiving and storing compact cassettes in transverse parallel position, having a bottom wall, left and right sidewalls and back and front walls joined together to form an open top rectangular shaped tray, said walls extending substantially equidistantly above the bottom wall a heighth less than that of a compact cassette, said tray having an inside width between the sidewalls slightly greater than a length of a compact cassette and having an inside length between front and back walls equal to a sum of a plurality of incremental distances, each increment being slightly greater than a maximum width of a compact cassette, said tray having a plurality of cassette positioning rib sets, a first member of each set being integral with a right tray wall inner surface and extending a relatively short distance outwardly therefrom and at a lower rib portion being integral with a tray bottom wall inner surface and extending a relatively short distance transversely along said bottom wall inner surface and a remaining second member of each rib set being similarly disposed along a tray left wall inner surface and bottom wall inner surface and being in parallel alignment with the right wall set member, said plurality of rib sets being disposed longitudinally from a first rib set adjacent a front tray wall inner surface to a last rib set adjacent a back tray wall inner surface, each of said rib sets having a distance between adjacent rib sets such that a compact cassette positioned between adjacent rib sets and a cassette recorder coupling edge resting on and in parallel alignment with the tray bottom wall inner surface nearly touches an adjacent compact cassette similarly positioned between adjacent rib sets, said cassettes being positioned in leafed arrangement, a top cover rearwardly hinged to the tray back wall having a cover top wall, left and right cover sidewalls, and front and back cover walls joined together to form an open bottom rectangular shaped tray covering having an opening substantially equivalent to a tray top opening, said cover walls being of at least sufficient depth, when the cover is closed, to enclose compact cassettes positioned transversely within the tray, and a case latch means further comprising in combination;

a tray cover latch engaging throughhole in the cover front wall a relatively short distance above a tray cover front wall lower edge extending through the tray cover front wall, said throughhole having a latch positioning slot opening downwardly and out of the cover front wall lower edge, said throughhole further having latch hook retaining shoulders on each side of said slot, a latch member having a lower end mounted on a tray front wall inner surface, a throughhole engaging hook on a top end, a latch positioning member a relatively short distance below said hook, and a resilient shank intermediate said latch positioning member and the lower end, said latch positioning member extending forwardly across a tray front wall top edge and forward the tray front wall front surface a distance greater than a throughhole engaging hook length, said latch positioning member being inserted into the said slot when the cover is closed and said hook engaging said hook engaging shoulder, said forwardly extending latch positioning member further comprises a push button for disengaging the latch hook upon depressing the push button thereby disengaging the latch hook from the throughhole to permit opening the cover.

2. A case as set forth in claim 1 wherein the tray cover throughhole is rectangular and the slot has curved edge walls for accepting a rounded latch positioning member having a curved surface opposite a curvature of the slot edge walls and wherein the throughhole engaging latch hook means is tapered from a latch hook back top portion to a hook front, said hook front having a very thin front hook edge, said hook having throughhole engaging shoulder disposed backwardly from and parallel to said front hook edge for engaging said throughhole when the cover is closed, said tapering of the hook to provide for backward movement of the hook when closing the cover until the cover is closed completely.

3. A case as set forth in claim 2 wherein the tray cover throughhole is circular and the throughhole engaging hook comprises a throughhole mating rod member.

4. A case as set forth in claim 1 further providing the push button means having fixedly attached thereto on a front surface thereof a throughhole cover plate.

5. A case as set forth in claim 1 further providing a carrying handle removably mounted in brackets mounted on a tray front wall outer surface.

6. A case as set forth in claim 1 wherein the top cover is rearwardly hinged to the tray by a plurality of hinges each hinge comprising in combination a hinge pin retaining member fixedly attachd to a tray back wall outer surface having a cylindrical hinge pin fixedly retained therein and extending outwardly therefrom in parallel alignment with a tray back wall top surface and, a hinge pin insertion member fixedly attached to a cover back wall outer surface having a hinge pin cylindrical insertion cavity for slidably and rotatably inserting a mating hinge pin thereinto thereby positioning the cover above the tray in hinged position providing for swinging the cover downwardly and upwardly with respect to the tray top opening and further for slidably removing the cover by sliding the cover away from the hinge pin retaining member.

7. A case as set forth in claim 6 wherein said hinge pin retaining member is fixedly attached to the cover back wall outer surface and the hinge pin insertion member is fixedly attached to the tray back wall outer surface.

8. A case for storing and carrying a plurality of magnetic tape cassettes of a type described as compact cassettes having two tape drive hub openings in the sides thereof and a cassette recorder coupling edge having a magnetic tape head engaging opening therein on said edge, said case comprising in combination;

a cassette tray for receiving and storing compact cassettes in transverse parallel position, having a bottom wall, left and right sidewalls, back and front walls and one or more partitions extending longitudinally between and at right angles to the front and back walls, said walls and partitions being joined together to form a plurality of two or more open top rectangular shaped tray compartments, a first compartment being formed between a right sidewall inner surface and a first partition left inner surface, and successive compartments thereafter, being formed between successive right and left partition surfaces and a last compartment formed between a last partition right inner surface and a left wall inner surface, said walls and partitions extending above the bottom wall a heighth less than that of a compact cassette, each of said compartments having an inside width slightly greater than a compact cassette length and having an inside length between front and back walls equal to a sum of a plurality of incremental distances, each increment being slightly greater than a maximum width of a compact cassette; and a top cover rearwardly hinged to the tray back wall having a cover top wall, left and right sidewalls, and front and back walls joined together to form an open bottom tray cover having said openings mating in hinged alignment with the tray opening and said cover walls being at least of sufficient depth, when the cover is closed, to enclose compact cassettes positioned transversely within the case, said tray compartments each having a plurality of cassette positioning rib sets, one member of each rib set being integral with a right compartment wall inner surface and extending a relatively short distance outwardly therefrom and at a lower rib portion being integral with a tray bottom wall inner surface and extending a relatively short distance transversely along said bottom wall inner surface and a remaining corresponding rib set member of each rib set being similarly disposed along an opposite compartment wall inner surface and the bottom wall inner surface adjacent thereto, said wall surfaces together with front and back walls defining a compartment, each of said rib set members being in transverse parallel alignment with respect to a corresponding opposite rib set, said plurality of rib sets being disposed longitudinally and substantially in equidistant increments from a compartment front wall inner surface to a compartment back wall inner surface, each of said rib sets having a distance between adjacent rib sets such that a compact cassette positioned therebetween with a cassette recorder coupling edge resting on and being parallel to a tray bottom wall inner surface nearly touches an adjacent compact cassette similarly positioned between adjacent rib sets, said cassettes being positioned in leafed arrangement, each of said plurality of compartments having substantially equivalent dimensions and rib set arrangement, and a case latch means further comprising in combination:
a tray cover latch engaging throughhole a relatively short distance above a tray cover front wall lower edge extending through the tray cover front wall, said throughhole having a latch positioning slot opening downwardly and out of the cover front wall lower edge, said throughhole further having latch hook retaining shoulders on each side of said slot, a latch member having a lower end mounted on a tray front wall inner surface, a throughhole engaging hook on a top end, a latch positioning member a relatively short distance below said hook, and a resilient shank intermediate the latch positioning member and the lower end, said latch positioning member extending forwardly across the tray front wall top surface and foward the tray front wall front surface a distance greater than a throughhole engaging hook means length, said latch positioning member for aligning the latch member in latching position being inserted into the said slot when the cover is closed and said hook engaging said shoulders, said forwardly extending latch positioning member further comprises a push button for disengaging the latch hook from the throughhole upon depressing the push button thereby disengaging the latch hook means from the throughhole to permit opening the cover.

9. A case as set forth in claim 8 wherein the tray cover throughhole is rectangular and the slot has curved edge walls for accepting a rounded latch positioning member having a curved surface opposite a curvature of the slot edge walls and wherein the throughhole engaging latch hook means is tapered from a latch hook back top portion to a hook front, said hook front having a very thin front hook edge, said hook having throughhole engaging shoulder disposed backwardly from and parallel to said front hook edge for engaging said throughhole when the cover is closed, said tapering of the hook to provide for backward movement of the hook when closing the cover until the cover is closed completely.

10. A case as set forth in claim 8 wherein the tray cover throughhole is circular and the throughhole engaging hook comprises a throughhole mating rod means.

11. A case as set forth in claim 8 further providing the push button means having fixedly attached thereto on a front surface thereof a throughhole cover plate.

12. A case as set forth in claim 8 further providing a carrying handle removably mounted in brackets mounted on a tray front wall outer surface.

13. A case as set forth in claim 8 wherein the top cover is rearwardly hinged to the tray by a plurality of hinges each hinge comprising in combination a hinge pin retaining member fixedly attached to a tray back wall outer surface having a hinge cylindrical pin fixedly retained therein and extending outwardly therefrom in parallel alignment with a tray back wall top surface and a hinged pin insertion member fixedly attached to a cover back wall outer surface having a hinge pin cylindrical insertion cavity for slidably and rotatably inserting a mating hinge pin thereinto thereby positioning the cover above the tray in hinged position providing for swinging the cover downwardly and upwardly with respect to the tray top opening and further for slidably removing the cover by sliding the cover away from the hinge pin retaining member.

14. A case as set forth in claim 13 wherein said hinge pin retaining member is fixedly attached to the cover back wall outer surface and the hinge pin insertion member is fixedly attached to the tray back wall outer surface.

* * * * *